(12) United States Patent
Kozuma

(10) Patent No.: US 12,241,745 B2
(45) Date of Patent: Mar. 4, 2025

(54) VERTICAL DEFLECTION ESTIMATION DEVICE

(71) Applicant: TOKYO INSTITUTE OF TECHNOLOGY, Tokyo (JP)

(72) Inventor: Mikio Kozuma, Tokyo (JP)

(73) Assignee: TOKYO INSTITUTE OF TECHNOLOGY, Tokyo (JP)

( * ) Notice: Subject to any disclaimer, the term of this patent is extended or adjusted under 35 U.S.C. 154(b) by 258 days.

(21) Appl. No.: 17/924,262

(22) PCT Filed: Apr. 12, 2021

(86) PCT No.: PCT/JP2021/015126
§ 371 (c)(1),
(2) Date: Nov. 9, 2022

(87) PCT Pub. No.: WO2021/229969
PCT Pub. Date: Nov. 18, 2021

(65) Prior Publication Data
US 2023/0221119 A1    Jul. 13, 2023

(30) Foreign Application Priority Data

May 11, 2020  (JP) .................... 2020-083056

(51) Int. Cl.
*G01C 21/16*  (2006.01)
(52) U.S. Cl.
CPC ................. *G01C 21/165* (2013.01)
(58) Field of Classification Search
CPC ...... G01C 21/00; G01C 21/16; G01C 21/165; G01V 7/00; G01V 7/06
See application file for complete search history.

(56) References Cited

U.S. PATENT DOCUMENTS 3,803,916 A  *  4/1974  Dematteo ............ G01C 21/188
                                                         73/382 R
4,060,718 A      11/1977  Huddle
(Continued)

FOREIGN PATENT DOCUMENTS

| JP | S 53-95067 A | 8/1978 |
| JP | 2005-172651 A | 6/2005 |
| JP | 2020-016490 A | 1/2020 |

OTHER PUBLICATIONS

International Search Report (ISR) (PCT Form PCT/ISA/210), in PCT/JP2021/015126, dated Jun. 29, 2021.
(Continued)

*Primary Examiner* — Nguyen Q. Ha
(74) *Attorney, Agent, or Firm* — MCGINN I.P. LAW GROUP, PLLC

(57) ABSTRACT

A vertical deflection estimation device usable for inertial navigation includes: a gravity gradiometer (10), a known vertical deflection library part (20), a high frequency extraction part (30), and an estimation part (40). The gravity gradiometer (10) measures vertical deflection in accordance with positional movement of the gravity gradiometer (10). The known vertical deflection library part obtains known coarse information of vertical deflection on map in accordance with the positional movement of the gravity gradiometer (10). The high frequency extraction part (20) extracts, from the measured vertical deflection, a high spatial frequency component of the measured vertical deflection. The estimation part (40) corrects the measured vertical deflection to derive estimated vertical deflection as highly accurate vertical deflection by combining the known coarse information of vertical deflection on map with the extracted high spatial frequency component of the measured vertical deflection.

8 Claims, 3 Drawing Sheets

(56) References Cited

U.S. PATENT DOCUMENTS

| | | | |
|---|---|---|---|
| 5,774,832 A * | 6/1998 | Vanderwerf | G01P 7/00 |
| | | | 701/504 |
| 5,912,643 A | 6/1999 | Chew et al. | |
| 6,014,103 A | 1/2000 | Sumner et al. | |
| 11,378,397 B2 | 7/2022 | Kozuma et al. | |
| 2022/0290988 A1 | 9/2022 | Kozuma et al. | |

OTHER PUBLICATIONS

Heller W.G. et al: "Assessment of Means for Determining Deflection of the Vertical", US Army Corps of Engineers Engineer Topographic Laboratories, 1982 (Jan. 1, 1982), XP093151361, Retrieved from the Internet: URL:https://apps.dtic.mil/sti/tr/pdf/ADA131286.pdf [retrieved on Apr. 12, 2024] (In English).
Extended European Search Report, dated May 10, 2024 in European Application No. 21803793.5 (In English).

* cited by examiner

VERTICAL DEFLECTION ESTIMATION DEVICE

TECHNICAL FIELD

The present invention relates to a vertical deflection estimation device, and more particularly to a vertical deflection estimation device for reducing an error in a gravity gradiometer. The present invention relates also to an inertial navigation system using such a vertical deflection estimation device.

BACKGROUND ART

Along with the recent rapid development of automatic control and autonomous navigation technologies, a demand for improving in accuracy of the current position of a mobile body has been increasing every year. As the autonomous navigation technology, a GNSS (Global Navigation Satellite System) and an INS (Inertial Navigation System) are known.

As a sensor for use in the INS, a fiber optic gyroscope (FOG) is known (see, for example, Patent Document 1). The FOG is a rotation angular velocity sensor utilizing the Sagnac effect of light. The fiber optic gyroscope uses a fiber optic coil and has advantages of having no moving element, being smaller in size than conventional mechanical gyros, and being maintenance free and thus has been attracted attention.

In the inertial navigation system, such a highly accurate gyro sensor and an accelerometer are used to calculate the velocity and position of a mobile body to thereby obtain the current position thereof. However, no matter how highly accurate the gyro sensor and accelerometer are, there is a limit to measurement accuracy due to influence of vertical deflection. The vertical deflection refers to the angle formed by the vertical line at a certain point on the earth as measured based on the gravity of the earth acting direction at that point and a normal line erected on a virtual earth ellipsoid passing that point. Ideally, the direction of the measured vertical line at a certain point on the earth should be equal to the direction of a perpendicular (normal) line drawn to a reference ellipsoid serving as a reference of the actual geographical longitude and latitude at that point; however, the direction of the measured vertical line is the gravity acting direction, so that misalignment occurs between the measured vertical line direction and the perpendicular (normal) line direction due to local difference in the earth's density distribution. This misalignment refers to vertical deflection. Normally, when horizontality can be grasped by the gyro sensor, the gravity and the acceleration of a mobile body can be distinguished from each other. However, the presence of vertical deflection causes the horizontal component of the gravity to be misidentified as the acceleration of the mobile body. That is, whether a detected component is the acceleration of the mobile body or the vertical deflection cannot be determined, which is the cause of an error in the inertial navigation system.

Thus, ideally, to reduce the influence of such vertical deflection, the vertical deflection is measured using a gravity gradiometer and calculation results of the current position and velocity of the mobile body obtained using the gyro sensor and accelerometer are corrected based on the measured vertical deflection. The gravity gradiometer has accelerometers disposed crisscross along the X-Y axes on a rotating disk and measures an acceleration in the circumferential direction to thereby measure gravity gradient.

On the other hand, gravity measurement has been undertaken using a satellite, and a geoid map of the earth exists. By spatially differentiating the geoid, vertical deflection can be derived. Thus, it is possible to correct the calculation results of the current position and velocity of the mobile body obtained using the gyro sensor and accelerometer using the vertical deflection derived from the geoid map.

CITATION LIST

Patent Document

Patent Document 1: Japanese Patent Application Kokai Publication No. 2005-172651

DISCLOSURE OF THE INVENTION

Problems to be Solved by the Invention

However, the gravity gradiometer uses a rotating disk, so that errors are accumulated and increased with long-term use. Further, to reduce such a long-term error, it is necessary to use a rotary mechanism exhibiting significantly high performance and a thermostatic chamber, which increases cost. Further, a gravity gradiometer that can maintain high accuracy over a long term is apt to be large in size and is thus difficult to be mounted on a mobile body.

Further, the geoid map generally has a spatial resolution of as small as about 100 km, which is significantly insufficient for use in correcting the inertial navigation system. That is, the spatial resolution of the geoid map is insufficient for correcting the calculation results of the current position and velocity of the mobile body.

Under such circumstances, there is a demand for developing a device capable of deriving vertical deflection with high accuracy over a long term even using a gravity gradiometer that does not have a high long-term accuracy.

In view of the above circumstances, the present invention is to provide a vertical deflection estimation device capable of deriving vertical deflection with high accuracy over a long term. The present invention is also to provide an inertial navigation system capable of achieving highly accurate inertial navigation over a long term by using such a vertical deflection estimation device.

Means for Solving the Problems

To attain the above object of the present invention, a vertical deflection estimation device according to the present invention may include: a gravity gradiometer (10) for measuring vertical deflection in accordance with positional movement of the gravity gradiometer (10); a known vertical deflection library part (20) for obtaining known coarse information of vertical deflection on map in accordance with the positional movement of the gravity gradiometer (10); a high frequency extraction part (30) for extracting, from the measured vertical deflection, a high spatial frequency component of the measured vertical deflection; and an estimation part (40) for correcting the measured vertical deflection to derive estimated vertical deflection as highly accurate vertical deflection by combining the known coarse information of vertical deflection on map with the extracted high spatial frequency component of the measured vertical deflection.

The vertical deflection estimation device may further include a low frequency extraction part (50) for extracting, from the known coarse information of vertical deflection on map in the known vertical library part (20), a low spatial frequency component of the known coarse information of vertical deflection on map in accordance with the positional movement of the gravity gradiometer (10), wherein the estimation part (40) corrects the measured vertical deflection to derive estimated vertical deflection as highly accurate vertical deflection by combining the low spatial frequency component extracted by the low frequency extraction part with the high spatial frequency component extracted by the high frequency extraction part (30)

The low frequency extraction part may determine a cutoff frequency for the low spatial frequency component in accordance with the spatial resolution of information of the known vertical deflection on map that the known vertical deflection library part has.

The high frequency extraction part may determine a cutoff frequency for the high spatial frequency component in accordance with the drift error characteristics of the gravity gradiometer.

The known vertical deflection library part may obtain information of the known vertical deflection on map by spatially differentiating a geoid height on the map using a global geoid map.

The known vertical deflection library part may obtain information of the known vertical deflection on map by using a difference between astronomical latitude and longitude by Talcott's method and geodetic latitude and longitude.

The gravity gradiometer may obtain the measured vertical deflection by multiplying gravity gradient by velocity and time-integrating.

An inertial navigation system according to the present invention for calculating a velocity and a position of a mobile body (1), wherein the gravity gradiometer (10) is mounted on the mobile body (1) and measures vertical deflection in accordance with the positional movement of the mobile body (1), the inertial navigation system may further comprise: an acceleration sensor (60) mounted on the mobile body (1) and configured to measure an acceleration of the mobile body (1); a gyro sensor (70) mounted on the mobile body (1) and configured to measure an angular velocity of the mobile body (1); and a position information calculation part (80) calculating the velocity and position of the mobile body (1) by using the estimated vertical deflection derived by the estimation part (40), the acceleration measured by the acceleration sensor and the angular velocity measured by the gyro sensor.

Advantageous Effects of the Invention

The vertical deflection estimation device according to the present invention has an advantage of being capable of deriving vertical deflection with high accuracy over a long term. Further, the inertial navigation system according to the present invention has an advantage of being capable of achieving highly accurate inertial navigation over a long term.

BEST MODE FOR CARRYING OUT THE INVENTION

Figure 1:
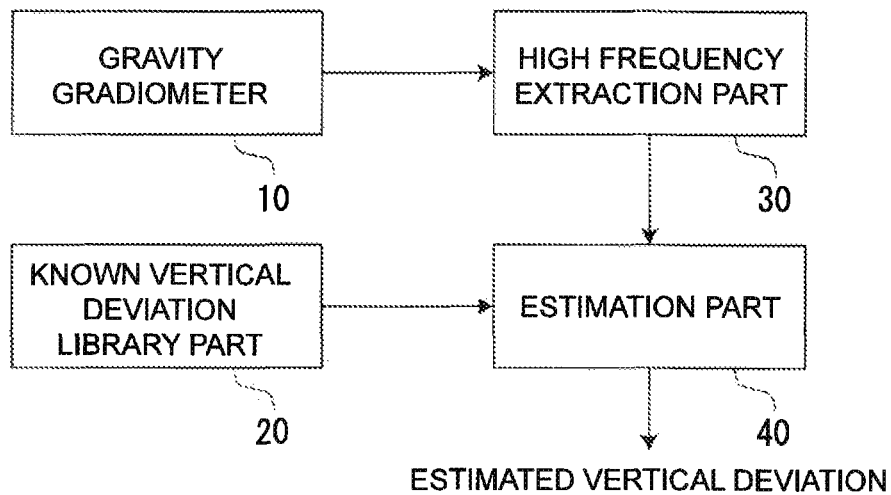
FIG. 1 is a schematic block diagram for explaining a vertical deflection estimation device according to the present invention.

Hereinafter, an embodiment for practicing the present invention will be described with reference to the illustrated examples. A vertical deflection estimation device according to the present invention is usable for inertial navigation for a mobile body. FIG. 1 is a schematic block diagram for explaining the vertical deflection estimation device according to the present invention. As illustrated, the vertical deflection estimation device according to the present invention includes a gravity gradiometer 10, a known vertical deflection library part 20, a high frequency extraction part 30, and an estimation part 40.

The gravity gradiometer 10 measures vertical deflection in accordance with the positional movement of the mobile body and outputs it as measured vertical deflection. For example, the gravity gradiometer 10 may be an instrument that can calculate the measured vertical deflection by multiplying gravity gradient by velocity and time integrating the multiplication result. That is, an acceleration sensor may be used for the gravity gradiometer to perform multiplication by the moving velocity of the mobile body. In the present invention, the long-term sensitivity required of the gravity gradiometer 10 need not be very high, and 5 the gravity gradiometer 10 may have noise giving a long-term drift of, e.g., about several mE√Hz. The gravity gradiometer 10 only needs to be highly accurate in a short term with respect to the movement of the mobile body and to have a high spatial resolution to some extent. That is, the gravity gradiometer 10 can preferably complete measurement in a time short enough to follow the moving velocity of the mobile body. The gravity gradiometer 10 is mounted on, e.g., the mobile body configured to be movable. For example, a gimbal is used to fix the gravity gradiometer 10 to the mobile body so as to eliminate the influence of the tilt of the mobile body. The mobile body may be a ship, an underwater vehicle, etc.

The known vertical deflection library part 20 is provided for obtaining known coarse information of vertical deflection on map as known vertical deflection. That is, the known vertical deflection is the vertical deflection that has previously been measured by a certain means at each location. The known vertical deflection library part 20 may be a storage device that stores information of the known vertical deflection on map.

Here, the known vertical deflection may be obtained by using, e.g., a global geoid map. The known vertical deflection on map can be obtained by spatially differentiating a geoid height on map. Here, the global geoid map can use information observed by, e.g., a gravity observation satellite, GOCE. The measurement accuracy of the GOCE satellite has a spatial resolution with an error of about 2 cm per about 100 km in terms of the geoid height. That is, information of the geoid height with an error of 2 cm for each 100 km mesh can be obtained. By spatially differentiating such geoid height on map, the known vertical deflection can be obtained.

Further, the known vertical deflection may use a difference between astronomical latitude and longitude by Talcott's method and geodetic latitude and longitude. This is in which a difference between astronomical latitude and longitude obtained using, e.g., a zenith telescope or a photographic zenith tube and geodetic latitude and longitude obtained by, e.g., GNSS is obtained at each location as vertical deflection.

As described above, the known vertical deflection may be obtained by various conventional or future-developed means. As described in Background Art, information of such known vertical deflection has a low spatial resolution. Therefore, an error occurs with respect to actual vertical deflection at a certain location on map. On the other hand, the gravity gradiometer 10 itself does not have a long-term accuracy, so that when it is applied to an inertial navigation system to be used over a long term, the error may become large. In order to cope with this, the vertical deflection estimation device according to the present invention is configured as described below.

First, the high frequency extraction part 30 is used to extract a high spatial frequency component of the measured vertical deflection in accordance with the positional movement of the mobile body which is measured by the gravity gradiometer 10. In other words, a low spatial frequency component is removed from the measured vertical deflection output from the gravity gradiometer 10. Specifically, Fast Fourier Transform (FFT) is applied to the measured vertical deflection measured by the gravity gradiometer 10 so as to cut a frequency component equal to or less than, e.g., 1/10 hours. As a result, the influence of the slow drift of the gravity gradiometer 10 on the time is removed, whereby only high-sensitivity information in a short term (information having large fluctuation in a short term) is extracted. The high frequency extraction part 30 may be realized by, e.g., a computer program.

Here, the high frequency extraction part 30 may determine the cutoff frequency for the high spatial frequency component in accordance with the performance of the gravity gradiometer 10. That is, the cutoff frequency for the high spatial frequency component is determined in accordance with the drift error characteristics of the gravity gradiometer 10. For example, when the drift error of the gravity gradiometer 10 is stable over a long term, the cutoff frequency for the high spatial frequency component is set to a lower value. This makes it possible to adjust the cutoff frequency so as to obtain an appropriate estimated vertical deflection in accordance with the drift error characteristics of the gravity gradiometer 10.

On the other hand, the known coarse vertical deflection on map in accordance with the positional movement of the mobile body mainly also includes a low spatial frequency component due to a low spatial resolution. That is, it is the information slowly fluctuating over a long term.

Thus, the vertical deflection estimation device according to the present invention obtains estimated vertical deflection using the following estimation part 40. The estimation part 40 derives the estimated vertical deflection by combining the known vertical deflection on map in accordance with the positional movement of the mobile body using information of the known coarse vertical deflection of the known vertical deflection library part 20 and the measured vertical deflection of the high spatial frequency component extracted by the high frequency extraction part 30. That is, information having slowly fluctuating over a long term is combined with information having large fluctuation in a short term, which is extracted by the high frequency extraction part 30. This makes it possible to complement a long-term change using the known vertical deflection while removing the influence of the drift even using the gravity gradiometer 10 that does not have a high long-term accuracy. That is, it is possible to complement the known vertical deflection that does not have a high short-term accuracy (having a low spatial resolution) with the use of the gravity gradiometer 10 having a high short-term accuracy. Therefore, the vertical deflection estimation device according to the present invention can derive the estimated vertical deflection with high accuracy over a long term. The estimation part 40 may be realized by, e.g., a computer program.

Figure 2:
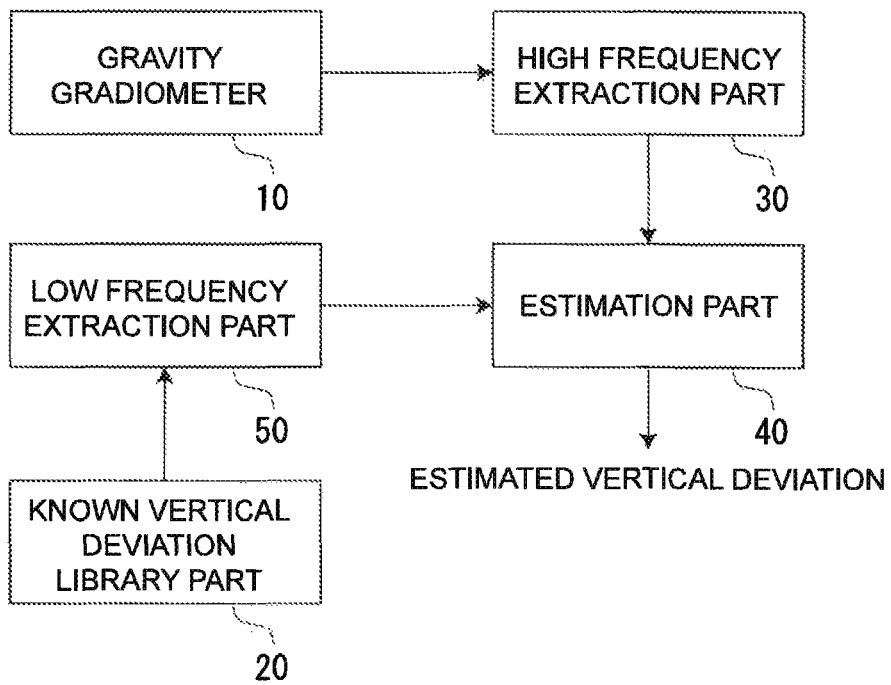
FIG. 2 is a schematic block diagram for explaining another example of the vertical deflection estimation device according to the present invention.

In the known vertical deflection library part 20, the spatial resolution may differ depending on the information of the known vertical deflection to be used. For example, on the ocean, the vertical deflection becomes low in spatial resolution. On the other hand, in a specific inland area, the information of the vertical deflection having a high spatial resolution to some extent may sometimes be obtained through long-term investigation. In such a case, on the assumption of being combined with the high spatial frequency component of the gravity gradiometer 10, only the low spatial frequency component of the known vertical deflection may be used. That is, the high spatial frequency component of the known vertical deflection may be removed. FIG. 2 is a schematic block diagram for explaining another example of the vertical deflection estimation device according to the present invention. In the drawing, the same reference numerals as those in FIG. 1 denote the same parts. As illustrated, the vertical deflection estimation device according to another example additionally includes a low frequency extraction part 50. The low frequency extraction part 50 extracts a low spatial frequency component of in the known vertical deflection on map in accordance with the positional movement of the mobile body using information of the known vertical deflection that the known vertical deflection library part 20. The estimation part 40 combines the known vertical deflection of the low spatial frequency component extracted by the low frequency extraction part 50 and the measured vertical deflection of the high spatial frequency component extracted by the high frequency extraction part 30, and derives the estimated vertical deflection.

Here, the low frequency extraction part 50 may determine a cutoff frequency for the low spatial frequency component in accordance with the spatial resolution of the information of the known vertical deflection on map that the known vertical deflection library part 20 has. For example, when the spatial resolution of the known vertical deflection is high to some extent, the cutoff frequency for the low spatial frequency component may be set to a higher value. This makes it possible to adjust the cutoff frequency so as to obtain an appropriate estimated vertical deflection in accordance with the accuracy of the information of the known vertical deflection that the known vertical deflection library part 20 has.

A simulation was conducted for explaining the effects of the vertical deflection estimation device according to the present invention. In this simulation, the vertical deflection was calculated under conditions that the mobile body went up north for 240 hours (10 days) at a velocity of 10 km/h, that is, moved by 2400 km from the 33rd degree of north latitude to the 57th degree of north latitude. The gravity gradiometer 10 used had a temporally decreasing noise of 3 E/√Hz and, in addition thereto, a temporally increasing noise of 3 mE√Hz. The latter noise gives the long-term drift of the gravity gradiometer 10. As the information of the known vertical deflection of the known vertical deflection library part 20, information obtained by a GOCE satellite was used. The gyro sensor and the acceleration sensor were each assumed to have no error. To perform simulation of the gravity gradiometer, actual vertical deflection information is required. In this simulation, high resolution (about 1 km) data that the United States of America had acquired for inland areas through a long-term investigation was used.

FIG. 3 are graphs obtained by the simulation performed for explaining the effects of the vertical deflection estimation device according to the present invention. FIG. 3A is a graph illustrating a temporal known vertical deflection in terms of the X-axis component (north-south direction component) stored in the known vertical deflection library part, and FIG. 3B is a graph illustrating a temporal known vertical deflection in terms of the Y-axis component (east-west direction component) stored in the known vertical deflection library part. In these graphs, the black line represents the actual vertical deflection (target vertical deflection) with a high resolution, and the gray line represents the known coarse vertical deflection obtained by spatially differentiating the geoid height on the global geoid map. FIG. 3C is a graph illustrating a temporal the measured vertical deflection in terms of the X-axis component (north-south direction component) measured by the gravity gradiometer 10, and FIG. 3D is a graph illustrating a temporal measured vertical deflection in terms of the Y-axis component (east-west direction component) measured by the gravity gradiometer 10. In these graphs, the black line represents the measured vertical deflection, and the gray line represents the measured vertical deflection of the high spatial frequency component extracted by the high frequency extraction part 30. FIG. 3E is a graph illustrating a temporal estimated vertical deflection in terms of the X-axis component (north-south direction component) derived by the estimation part 40, and FIG. 3F is a graph illustrating a temporal estimated vertical deflection in terms of the Y-axis component (east-west direction component) derived by the estimation part 40.

Figure 3A:
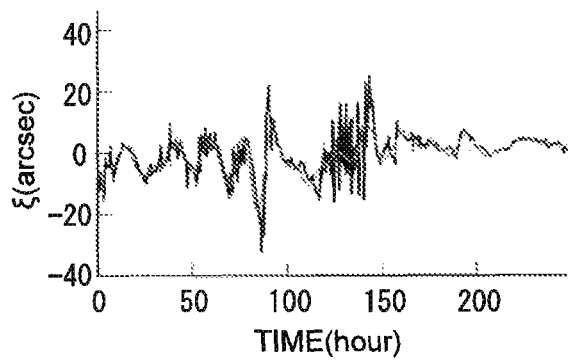
FIG. 3 is graphs obtained by a simulation performed for explaining the effects of the vertical deflection estimation device according to the present invention.
Figure 3B:
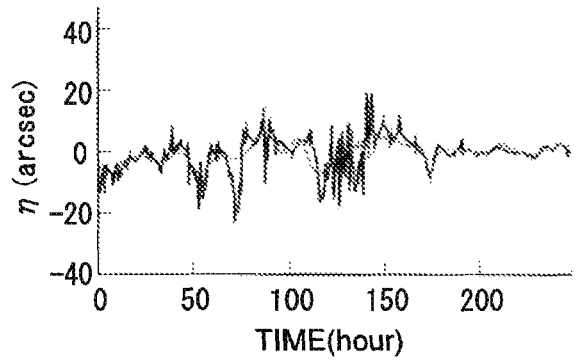
Figure 3C:
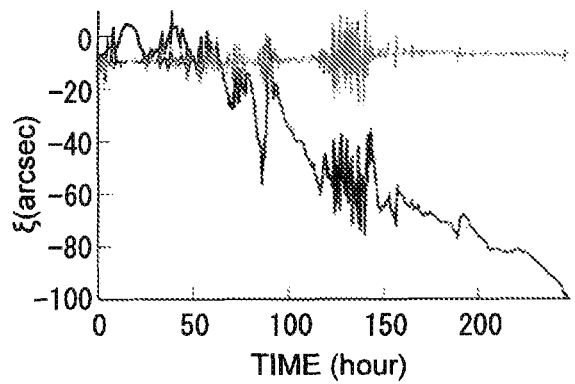
Figure 3D:
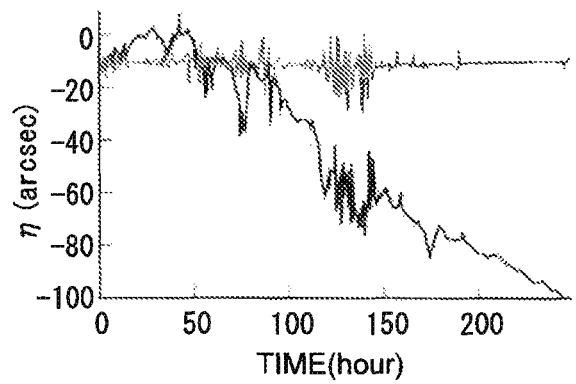
Figure 3E:
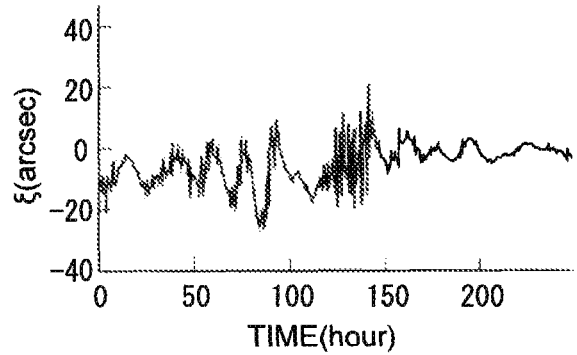
Figure 3F:
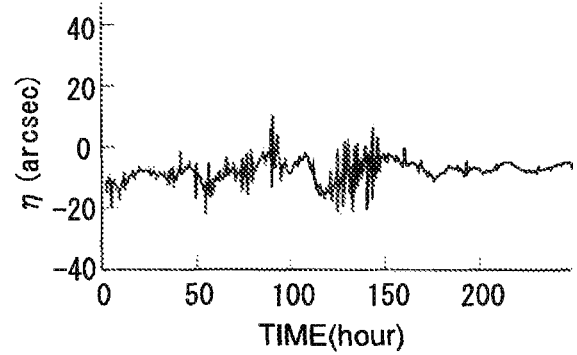

First, as can be seen from the gray lines in FIGS. 3A and 3B, the known vertical deflection by the global geoid map represents only a long-term change. Further, as can be seen from the black lines in FIGS. 3C and 3D, the measured vertical deflection of the gravity gradiometer 10 has a long-term drift. Further, as can be seen from the gray lines in FIGS. 3C and 3D, the influence of the drift error has been removed from the measured vertical deflection by the high frequency extraction part 30. In the vertical deflection estimation device according to the present invention, the two vertical deflections, i.e., known vertical deflection and measured vertical deflection having different characteristics are combined to obtain the estimated vertical deflection. As can be seen from FIGS. 3E and 3F, regarding the estimated vertical deflection by the vertical deflection estimation device according to the present invention, it can be understood that the estimation part 40 can accurately estimate close to the actual vertical deflection denoted by the black lines in FIGS. 3A and 3B by combining the known vertical deflection of the low spatial frequency component and the measured vertical deflection of the high spatial frequency component. That is, the vertical deflection estimation device according to the present invention can obtain a highly accurate vertical deflection over a long term.

Figure 4:
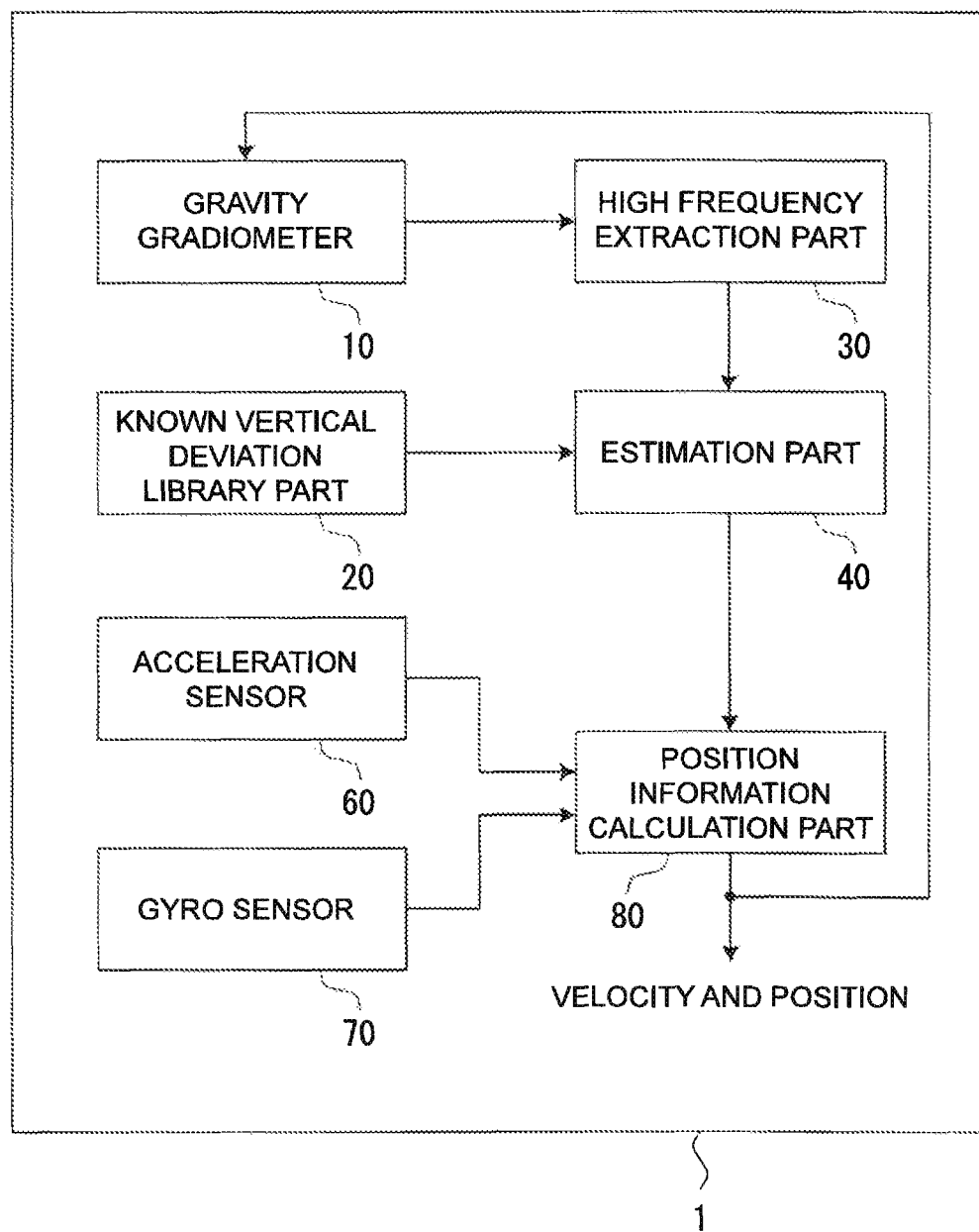
FIG. 4 is a schematic block diagram for explaining an inertial navigation system according to the present invention.

FIG. 4 is a schematic block diagram for explaining the inertial navigation system according to the present invention. In the drawing, the same reference numeral as those in FIG. 1 denote the same parts. As illustrated, the inertial navigation system according to the present invention calculates the velocity and position of the mobile body 1. The mobile body 1 may be, e.g., a submarine or the like. The inertial navigation system uses the above-described vertical deflection estimation device according to the present invention. The gravity gradiometer 10 of the vertical deflection estimation device may be mounted on the mobile body 1. The gravity gradiometer 10 is used to measure vertical deflection in accordance with the positional movement of the mobile body 1. Although the known vertical deflection library part 20, high frequency extraction part 30, and estimation part 40 are mounted on the mobile body 1 in the illustrated example, the present invention is not limited to this. That is, the known vertical deflection library part 20, high frequency extraction part 30, and estimation part 40 may be installed remotely from the mobile body 1 as long as the mobile body 1 can access the known vertical deflection library part 20 and the like as needed through a communication means or the like.

The inertial navigation system according to the present invention additionally includes an acceleration sensor 60, a gyro sensor 70, and a position information calculation part 80. The acceleration sensor 60 is mounted on the mobile body 1 and configured to measure the acceleration of the mobile body 1. As the acceleration sensor 60, various conventional or future-developed sensors may be used as long as they can measure the acceleration in the directions of three axes of X-, Y-, and Z-axes.

The gyro sensor 70 is mounted on the mobile body 1 and configured to measure the angular velocity of the mobile body 1. The gyro sensor 70 may be able to measure the angular velocity of the mobile body 1, and an optical fiber gyro sensor as high temporal accuracy is known, for example. Various conventional or future sensor to be developed may be adapted to the gyro sensor 70.

The position information calculation part 80 calculates the velocity and position of the mobile body 1 by using the estimated vertical deflection derived by the estimation part 40, the acceleration measured by the acceleration sensor 60, and the angular velocity measured by the gyro sensor 70. The position of the mobile body 1 may be calculated based on a change from initial position information. The position information calculation part 80 may be realized by, e.g., a computer program. The position and velocity information obtained by the position information calculation part 80 is supplied to the gravity gradiometer 10, whereby the measured vertical deflection is measured.

The inertial navigation system according to the present invention uses the above-described long-term high-accuracy vertical deflection estimation device according to the present invention, so that the accuracy of the inertial navigation becomes highly accurate over a long term. Specifically, for example, inertial navigation can be achieved with an accuracy of 100 m per 10 days.

The vertical deflection estimation device according to the present invention is not limited to the above-described illustrated examples and may be variously modified without departing from the spirit and scope of the invention.

REFERENCE SIGNS LIST

1: Mobile body
10: Gravity gradiometer
20: Known vertical deflection library part
30: High frequency extraction part
40: Estimation part
50: Low frequency extraction part
60: Acceleration sensor
70: Gyro sensor
80: Position information calculation part

The invention claimed is:

1. A vertical deflection estimation device usable for inertial navigation, the vertical deflection estimation device comprising:
   a gravity gradiometer for measuring vertical deflection in accordance with positional movement of the gravity gradiometer;
   a known vertical deflection library part for obtaining known coarse information of vertical deflection on map in accordance with the positional movement of the gravity gradiometer;
   a high frequency extraction part for extracting, from the measured vertical deflection, a high spatial frequency component of the measured vertical deflection; and
   an estimation part for correcting the measured vertical deflection to derive estimated vertical deflection as highly accurate vertical deflection by combining the known coarse information of vertical deflection on map with the extracted high spatial frequency component of the measured vertical deflection.

2. The vertical deflection estimation device according to claim 1, further comprising a low frequency extraction part for extracting, from the known vertical deflection part, a low spatial frequency component of the known coarse information of vertical deflection on map, wherein
   the estimation part corrects the measured vertical deflection to derive estimated vertical deflection as highly accurate vertical deflection by combining the low spatial frequency component extracted by the low frequency extraction part with the high spatial frequency component extracted by the high frequency extraction part.

3. The vertical deflection estimation device according to claim 2, wherein the low frequency extraction part determines a cutoff frequency for the low spatial frequency component in accordance with the spatial resolution of information of the known coarse information of vertical deflection on map that the known vertical deflection library part has.

4. The vertical deflection estimation device according to claim 1, wherein the high frequency extraction part determines a cutoff frequency for the high spatial frequency component in accordance with drift error characteristics of the gravity gradiometer.

5. The vertical deflection estimation device according to claim 1, wherein the known vertical deflection library part obtains the coarse information of vertical deflection on map by spatially differentiating a geoid height on the map using a global geoid map.

6. The vertical deflection estimation device according to claim 1, wherein the known vertical deflection library part obtains the coarse information of vertical deflection on map by using a difference between astronomical latitude and longitude by Talcott's method and geodetic latitude and longitude.

7. The vertical deflection estimation device according to claim 1, wherein the gravity gradiometer measures vertical deflection by multiplying gravity gradient by velocity and time-integrating.

8. An inertial navigation system for calculating a velocity and a position of a mobile body that uses the vertical deflection estimation device as claimed in claim 1, wherein
   the gravity gradiometer is mounted on the mobile body and measures vertical deflection in accordance with positional movement of the mobile body,
   the inertial navigation system further comprises:
   an acceleration sensor mounted on the mobile body and configured to measure an acceleration of the mobile body;
   a gyro sensor mounted on the mobile body and configured to measure an angular velocity of the mobile body; and
   a position information calculation part calculating the velocity and position of the mobile body by using the estimated vertical deflection derived by the estimation part, the acceleration measured by the acceleration sensor and the angular velocity measured by the gyro sensor.

* * * * *